US006832320B1

(12) United States Patent
Broyles, III et al.

(10) Patent No.: US 6,832,320 B1
(45) Date of Patent: Dec. 14, 2004

(54) OWNERSHIP TAG ON POWER-UP SCREEN

(75) Inventors: Paul J. Broyles, III, Cypress, TX (US); Rahul G. Patel, Houston, TX (US); Mark A. Piwonka, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/123,658

(22) Filed: Jul. 28, 1998

(51) Int. Cl.$^7$ ............................................... G06F 17/60
(52) U.S. Cl. ..................... 713/200; 713/200; 713/170; 713/155; 713/201
(58) Field of Search ................................. 713/200, 201, 713/202, 155, 170; 340/825.31, 825.34; 705/51, 52, 57; 709/229

(56) References Cited

U.S. PATENT DOCUMENTS

| | | | |
|---|---|---|---|
| 4,827,330 A | | 5/1989 | Walsh et al. ................. 358/280 |
| 4,951,249 A | * | 8/1990 | McClung et al. ............. 380/23 |
| 5,018,096 A | * | 5/1991 | Aoyama ..................... 364/900 |
| 5,187,352 A | * | 2/1993 | Blair et al. .................. 235/382 |
| 5,377,269 A | * | 12/1994 | Heptig et al. ................. 380/25 |
| 5,652,906 A | | 7/1997 | Kadosumi et al. .......... 395/800 |
| 5,805,882 A | | 9/1998 | Cooper et al. |
| 5,835,594 A | | 11/1998 | Albrecht et al. ............. 380/23 |
| 5,867,714 A | | 2/1999 | Todd et al. .................. 395/712 |
| 5,892,906 A | * | 4/1999 | Chou et al. .................. 713/201 |
| 5,930,504 A | | 7/1999 | Gabel ......................... 395/652 |
| 5,964,873 A | | 10/1999 | Choi ............................... 713/2 |
| 6,073,206 A | | 6/2000 | Piwonka et al. |
| 6,223,284 B1 | | 4/2001 | Novoa et al. |
| 6,301,665 B1 | | 10/2001 | Simonich et al. |
| 6,363,492 B1 | | 3/2002 | James, Jr. et al. |
| 6,397,337 B1 | | 5/2002 | Garrett et al. |
| 6,405,311 B1 | | 6/2002 | Broyles et al. |

FOREIGN PATENT DOCUMENTS

EP 000713311 A1 * 5/1996

OTHER PUBLICATIONS

Step #2: *Optimizing BIOS Settings*, EarthWeb Inc., © 1996–1999.
*Resetting/Disabling CMOS Setup Password*, EarthWeb, Inc., © 1996–1999.
*Changing BIOS Setup Settings that do not Appear to Exist*, EarthWeb, Inc., © 1996–1999.
*BIOS Setup Information Guide*, NetWeb, Inc., © 1996–1999.

* cited by examiner

Primary Examiner—Pierre E. Elisca (57) ABSTRACT

An "ownership tag" in a special area of memory of a computer system identifies an owner of the computer system by displaying the ownership tag during initialization of the computer system. The ownership tag may be presented during the installation and execution of the Basic Input Output System (BIOS) preferably during Power on Self Test (POST) process. An administrator may access the ownership tag by interrupting the process by pressing the an appropriate key, which transitions the computer to an administrator set up mode. An administrator able to enter the administrator password may then alter the contents of the protected memory, changing the ownership tag. The ownership tag is preferably stored in a region of memory not accessible to a typical user, but accessible to an administrator aware of the administrator password. The ownership tag is stored in a flash memory, which is very difficult to remove from the system board, or to modify without administrator-level security access. This makes it superior to conventional storage mechanisms such as RTC RPM, hard disk, etc. since these are easily modifiable and/or easily removable.

3 Claims, 4 Drawing Sheets

OWNERSHIP TAG ON POWER-UP SCREEN

BACKGROUND OF THE INVENTION

1. Field of the Invention

The present invention is related to system level computer operation, and more specifically, to security measures to protect computer systems.

2. Description of the Related Art

As the computer industry has evolved, computers have become smaller and more portable. Reductions in size, power and other considerations, as well as diminution of chip size and migration of multi-chip functionality to a single chip have resulted in computers that are light weight, easy to use, and easy to transport. Given the highly mobile nature of portable computers and their usage, the trend toward more portable computer systems is likely to accelerate.

While the increased portability of small computer systems has generated tremendous advantages for the computer industry as well as for computer users, the risk of lost or stolen computer systems presents a continuing problem. Often without malicious intent, computer users inadvertently pick up a computer system belonging to another person or company. Moreover, even within the computer industry, employees often take small computers home in the evening or on weekends to work. Inevitably, problems arise as to the proper custody or ownership of a particular computer system.

Such problems do not only exist between separate entities. Even within a company, each department may be allotted a particular group of computer systems, and computer systems from other departments may inadvertently be carried into the area. Confusion may arise as to which computers belong to which area.

In addition to loss or theft of the physical computer system, intellectual property issues can also become implicated. Proprietary information loaded onto a computer system can be difficult to remove completely since various traces of deleted information often remain on a hard disk. When computer systems are indistinguishable, it may be difficult to insure that such information has been properly deleted from a computer system. Computer systems that have previously stored highly sensitive information may inadvertently fall into the hands of those not cleared for the information, perhaps jeopardizing confidentiality.

Physically marking a computer system, for example by engraving or otherwise marking the exterior of the computer case, has significant disadvantages. With respect to the innocent switching of computer systems, permanently marking the exterior of a computer case can make computer systems very difficult to reallocate. Because the needs for computers within a company can evolve over time, companies must be free to reallocate computers among various departments as needs arise. Therefore, permanently marking computer systems may be disadvantageous. With respect to the malicious theft of computer systems, permanently marking the exterior of a computer case does not prevent a thief from merely covering the exterior marking, or from replacing the computer case with another computer case and attempting to resell the computer. Therefore, the difficulties inherent in computer system identification are not solved by marking the case or cover.

SUMMARY OF THE INVENTION

Briefly, the present invention provides a new and improved identification technique for computer system. The present invention allows a computer administrator or other trusted person to place a "ownership tag" in a special area of memory that cannot be altered without the use of a special administrator password. The ownership tag indicates the person or entity who presently has the right of custody of the computer system. When a user powers on the computer system, the ownership tag is presented to the user. For example, the ownership tag is preferably presented during the installation and execution of the Power on Self Test (POST) portion of the Basic Input Output System or BIOS.

With the present invention, the POST processes can be interrupted. The POST process are interrupted by a user pressing a suitable key during the normal POST routine. Interruption of the POST process allows the computer to enter an administrator set up mode. In the administrator set up mode, a system administrator may enter the administrator password and alter the contents of the protected memory, changing the ownership tag. Additionally, the system administrator can if desired alter the ownership tag remotely over a network.

According to the present invention, the administrator may enter a special administrator password in order to alter the ownership tag. If desired, the computer system may be set so that a person must physically remove the memory device containing the ownership tag, place the ownership tag memory in an external device that is not part of the computer system, and apply external voltages and currents not available within the computer system to the memory in order to change the ownership tag.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 09/071,127, entitled "A COMPUTER METHOD AND APPARATUS TO FORCE BOOT BLOCK RECOVERY," by Don R. James, Jr., Randall L. Hess, and Jell D. Kane, filed Apr. 30, 1998, U.S. Pat. No. 6,363,492, issued Mar. 26, 2002;

U.S. application Ser. No. 09/070,821, entitled "BOOT BLOCK SUPPORT FOR ATAPI REMOVABLE MEDIA DEVICES," by Paul J. Broyles III, and Don R. James, Jr., filed Apr. 30, 1998, abandoned;

U.S. application Ser. No. 09/070,475, entitled "SECURITY METHODOLOGY FOR DEVICES HAVING PLUG AND PLAY CAPABILITIES," by Christopher E. Simonich and Robin T. Tran, filed Apr. 30, 1998, U.S. Pat. No. 6,301,665, issued Oct. 9, 2001;

U.S. application Ser. No. 09/070,942, entitled "METHOD AND APPARATUS FOR REMOTE ROM FLASHING AND SECURITY MANAGEMENT FOR A COMPUTER SYSTEM," by Manuel Novoa, Paul H. McCann, Adrian Chrisan. and Wayne P. Sharum, filed Apr. 30, 1998, U.S. Pat. No. 6,223,284, issued Apr. 24, 2001;

U.S. application Ser. No. 09/070,866, entitled "A METHOD FOR FLASHING ESCD AND VARIABLES INTO A ROM," by Mark A. Piwonka, Louis B. Hobson, Jeff D. Kane, and Randall L. Hess, filed Apr. 30, 1998, U.S. Pat. No. 6,073,206, issued Jun. 6, 2000;

U.S. application Ser. No. 08/684,413, entitled "FLASH ROM PROGRAMMING," by Patrick R. Cooper, David J. Delide, and Hung Q. Le filed Jul. 19, 1996, U.S. Pat. No. 5,805,882, issued Sep. 8, 1998;

U.S. application Ser. No. 09/071,128, entitled "A UNIFIED PASSWORD PROMPT OF A COMPUTER SYSTEM," by Michael D. Garrett, Randall L. Hess, Chi W. So, Mohammed Anwarmariz, filed Apr. 30, 1998, U.S. Pat. No. 6,397,337, issued May 28, 2002;

U.S. application Ser. No. 09/123,307, entitled "COMPUTER SYSTEM WITH POST SCREEN FORMAT CONFIGURABILITY, by Rahul Patel and Paul J. Broyles III, filed Apr. 12, 2001; and U.S. application Ser. No. 09/123,672, entitled "METHOD FOR STORING BOARD REVISION," by Paul J. Broyles III and Mark A. Piwonka, filed Jul. 28, 1998, U.S. Pat. No. 6,405,311, issued Jun. 11, 2002; all of which are assigned to the assignee of this invention.

Computer System Overview

Figure 1:
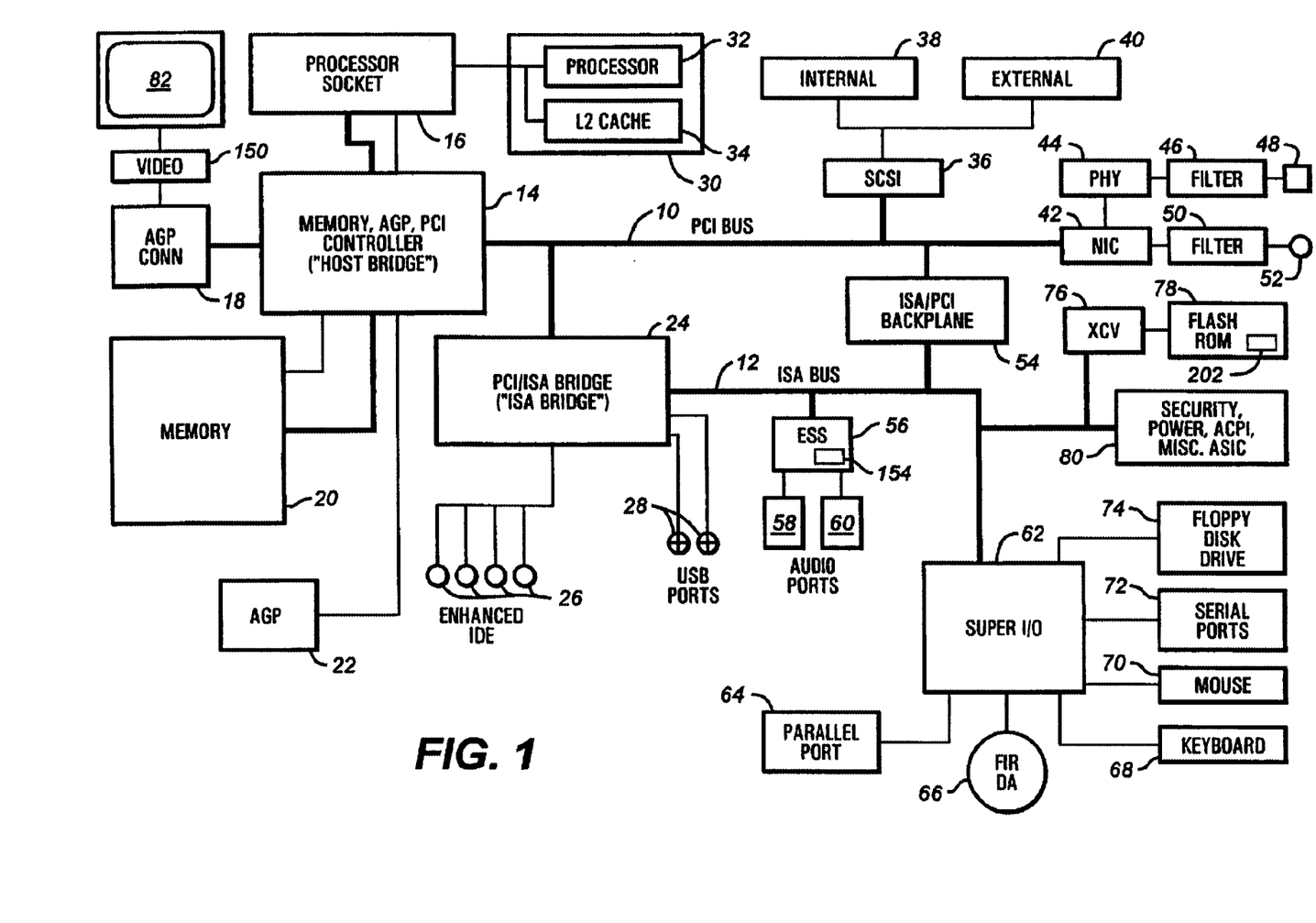
FIG. 1 is a schematic block diagram of a computer system according to the present invention.

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridge") bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX Host bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), real time clock (RTC), keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit ($I^2C$) protocol.

The PCI bus 10 couples a variety of devices that generally take advantage of a high speed data path. This includes a small computer system interface (SCSI) controller 26, with both an internal port 38 and an external port 40. In the disclosed embodiment, the SCSI controller 26 is a AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to an RJ-45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse port 70, additional series ports 72, and a floppy disk drive controller for a floppy disk drive 74. These devices are coupled through connectors to the Super I/O 62.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic.

Finally, a video display 82 can be coupled to the AGP connector 18 through an AGP master or video card 150 for display of data by the computer system S. The video display 82 displays video and graphics data provided by a video display process running on either the processor module 30 or another by a PCI device bus master or PCI bridge device bus master via host bridge 14. Video or graphics data may be stored in main memory or in a supplementary or extension memory module. Again, a wide variety of systems could be used instead of the disclosed system S without detracting from the spirit of the invention.

According to the present invention, certain memory locations having additional protection from alteration, such as indicated at 202 in flash ROM 78, contain an ownership tag. The ownership tag 40 stored identifies the owner or person presently authorized custody or allocation of computer system S. When processor module 30 is booted, a basic input output system (BIOS) is loaded and executed on processor module 30. According to the present invention, the processor associated with the BIOS obtains the ownership tag from the protected area of memory and displays the ownership tag on display 82.

The ownership tag display may be of any suitable form and content consistent with the amount of protected area of memory allocated for this purpose. The ownership tag, identifies the person or business unit or entity which is the presently authorized owner or custodian of the computer system S. The ownership tag may identify an individual person or business entity who is the owner of the computer system, or it may identify a section or group within a company which is the currently authorized custodian of the computer system. Again, the format in which the tag is displayed is selected by the authorized administrator, based in part on the amount of memory allocated for this purpose.

The Flash ROM Boot Block

Figure 2:
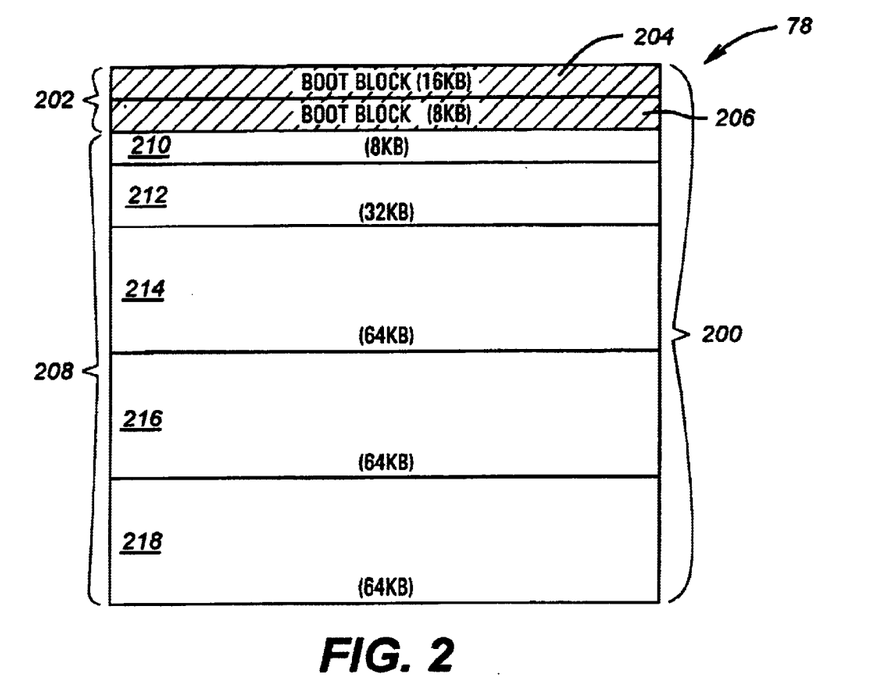
FIG. 2 is a schematic diagram of flash ROM components of the computer system of FIG. 1.

Turning now to FIG. 2, a sector partitioning structure 200 of the flash ROM 78 in the disclosed embodiment is shown. However, while this diagram is illustrative of one embodiment, the techniques according to the invention can be implemented in a variety of embodiments and can be implemented with a variety of non-volatile memory. The sector partitioning structure 200 is determined by the sector architecture of the particular flash ROM 78. The flash ROM 78 used in the disclosed embodiment is an Advanced Micro Devices (AMD) AM29F002 type flash ROM memory. The sector partitioning structure 200 shows a top boot block design architecture. The Advanced Micro Devices AM29F002 flash ROM memory can also be implemented with a bottom boot block design architecture.

A boot block sector 202 consists of a first boot block sector 204 of 16 kilobytes and a second boot block sector 206 of 8 kilobytes. The remaining 232 kilobytes form a system block 208 divided into 5 sectors 210–218. In the disclosed embodiment, the first sector 210 has 8 kilobytes, the second sector 212 has 32 kilobytes, and the remaining three sectors 214, 216, and 218 have 64 kilobytes equally.

The code stored in the system block 208 preferably contains the Basic Input/Output System (BIOS) code. The BIOS is code interfacing between the operating system and the specific hardware configuration, allowing the same operating system to be used with different hardware configurations. The boot block 202 contains the code necessary to initialize the systems when an anomaly during power-up is detected. During a boot block 202 initialization, preferably a reduced set of hardware is initialized, thus reducing the size of the code in the boot block 202. The boot block 202 code typically contains an initialization procedure for only the hardware necessary to perform limited functions. Typically a limited function necessary to be performed during boot block 202 initialization is the flash of the ROM 78.

The boot block 202, according to the invention, contains code initializing the hardware components necessary to flash the ROM 78 and to prompt the user for an administrative password. The boot block 202 code is contained within the boot block 202, which is protected from spurious initialization.

The boot block 202 is stored in a region or protected area of memory not available to the user. Such a protected area may, if desired, be a flash memory which must be physically removed to be reprogrammed. A person must physically remove the boot block 202 and place that memory device in an external device to the computer system to reprogram it. Further, such a memory device is preferably one which for reprogramming requires voltage or current devices not available within the computer system S.

The system block 208 is electronically protected, but the system S is at least physically capable of disabling that protection and overwriting the system block 208. During a flash, the system block 208 sectors may be rewritten with a new flash ROM image.

The flash ROM 78 is a 256 KB ROM that also supports a 24 KB boot block. The flash ROM 78, upon system initialization, creates a ROM image in RAM when the ROM image becomes corrupted or otherwise unsatisfactory. The flash ROM 78 uses nonvolatile (NV) RAM to check the image and to determine whether the ROM image, stored in RAM is valid. If the image is bad, the ROM boots from the boot block rather than from the image. The NVRAM and ROM contain logic to select a memory subsystem mode, such as factory mode, normal mode, and administrator mode. Depending on the level of security required, different information stored may be stored in this memory for display at selected times during operation of the computer system S. With the present invention, the ownership tag is protected at an administrator mode level.

The boot block 202 contains an additional portion of ROM code within the ROM 78 that is executed at system reset. The boot block code contains a validation portion and a boot portion. Upon system reset, the validation portion performs a validation check on the system ROM 78 itself and either jumps to the normal system ROM code or to the boot portion, depending upon the result of a validation check. The boot portion, although not capable of initializing any add-in devices except IDE's, does contain enough code to allow a system administrator to flash a valid ROM code into ROM 78 from a diskette. The boot block is physically located within the ROM to be accessed by the reset vector.

The flash ROM 78 as has been mentioned, may be an AMD29F002T, which contains a 16 KB sector, two 8 KB sectors, a 32 KB sector, and three 64 KB sectors. The boot block occupies the first two sectors (totaling 24 KB), and is followed by an 8 KB ESCD sector, a reserved 32 KB sectors, a 64 KB sector containing normal-mode ROM code, 64 KB of compressed data, and 64 KB of CPU BIOS update code.

The boot block 202 code typically is small in relation to the system block 208 code. According to the present invention, the ownership tag is stored in an administrator password protected area of flash ROM.

In the preferred embodiment, the memory sector with the ownership tag is not protected by the boot block hardware. Rather, the ownership tag is in a different sector of the flash ROM 78, one which is protectable by administrator password. This is described below.

Figure 3:
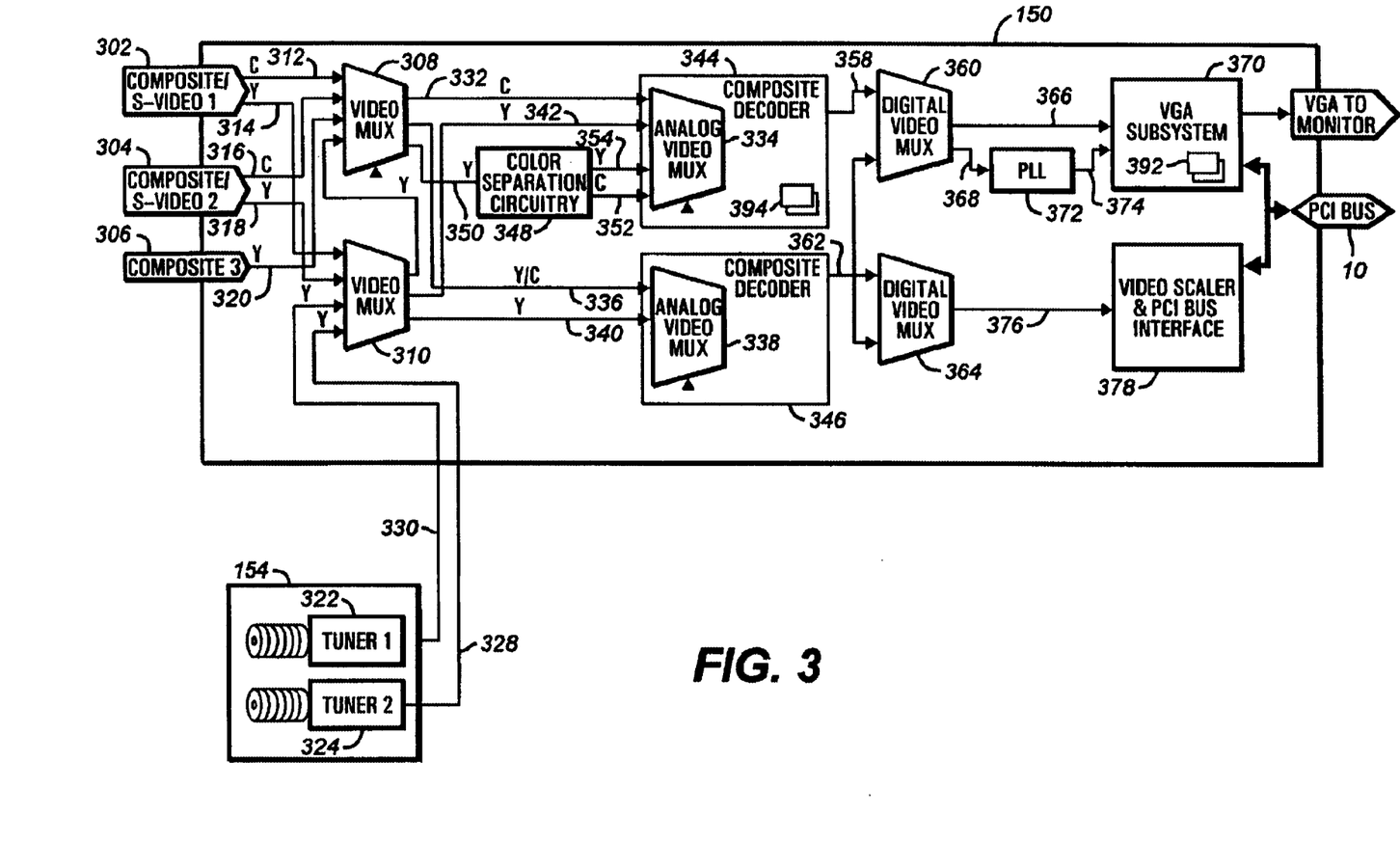
FIG. 3 is a schematic diagram of a video card and portions of the audio card of the computer system of FIG. 1.

Turning to FIG. 3, a schematic diagram of a typical AGP master or video card 150 and portions of the audio card 154 (FIGS. 1 and 3) of the computer system S is shown. The inputs to the video card 150 include three composite video signals provided through Y1C video connectors, composite_1 302, composite_2 304, and composite_3 306. The constituent signals of the three input composite signals are provided to a pair of video multiplexers 308 and 310. A chrominance signal on line 312 from the composite_1 signal 302 is provided to video multiplexer 310, and a luminance signal on line 314 of the composite_1 signal 302 is provided to video multiplexer 310. The chrominance signal on line 316 of the composite_2 signal 304 is provided to video multiplexer 308, and a luminance signal on line 318 of the composite_2 signal is provided to video multiplexer 310. The composites_3 signal 306 includes a luminance signal on line 320 which is provided to video multiplexer 308. Tuners 322 and 324 located on the audio card 154 of the computer system S also provide input luminance signals on lines 328 and 330 to video multiplexer 310. Other conventional devices that are provided on the audio card 154 are not shown as the audio card 154 as they are not critical to an understanding of the present invention.

A signal on line 332 outputted from video multiplexer 308 is provided to a primary analog video multiplexer 334. Video multiplexer 308 also provides a Y/C signal on line 336 to a secondary analog video multiplexer 338. Video multiplexer 310 provides signals on lines 340 and 342; the signal on line 342 is provided to the primary analog video multiplexer 334, and the signal on the other line 340 is provided to the secondary analog video multiplexer 338. The analog video multiplexer 334 is integrated into a primary video composite decoder 344, and the secondary analog video multiplexer 338 is integrated into a secondary video composite decoder 346. The primary decoder 344 of the present invention may or may not include color separation circuitry, as desired.

The video card 150 of the computer system 10 of the present invention includes color separation circuitry 348 external to the primary decoder 344. The color separation circuitry 348 receives a composite signal on line 350 as an input from video multiplexer 308 and outputs a chrominance signal on line 352 and a luminance signal on line 354 to the primary analog video multiplexer 334 of the primary decoder 344. The color separation circuitry 348 includes a digital comb filter, by which video information is converted from analog to digital and back to analog. The video signal from decoder 344 is provided on line 358 a digital video multiplexer 360. Similarly, an output video signal on line 262 of the secondary video composite decoder 346 is provided to a digital video multiplexer 364.

The primary digital video multiplexer 360 provides two outputs, on lines 266 and 268. The output on line 266 is provided directly to the VGA subsystem 370. The output on line 268 is directed to a phase-locked-loop 372 (PLL). The PLL 372 supplies a clock signal on line 324 to the VGA subsystem 370. The VGA subsystem 370 has two memory areas; one area is used as an off-screen memory area for storing video information, such as font information and data yet to be displayed. The other memory area of VGA subsystem 370 is used to store data which is currently being displayed. The VGA subsystem 370 also includes a VGA controller. In displaying data, the VGA controller reads from the off-screen memory, scales the data if needed, performs color space conversion, and then sends the data through a digital-to-analog converter (DAC) to the display.

In the secondary path, the secondary digital video multiplexer 364 provides a signal on line 276 to a video scaler and PCI bus interface 378. When data is sent over the secondary path, the data is downscaled if needed and then burst over the PCI bus 120 into the off-screen memory area of the video memory. The secondary path is typically used for picture-in-picture (PIP) functionality or pulling up web pages while watching television on the display 82 which are encoded in the vertical blanket interval (VBI).

Therefore, typically, the video display device 82 is a primary output device that cannot be turned off during the BIOS. The display screen 82 is always active, and is always capable of presenting an image provided to it. Various peripheral devices can attempt to control the video display during the BIOS, since the operating system has not been loaded and launched and thus cannot control the peripherals.

Figure 4:
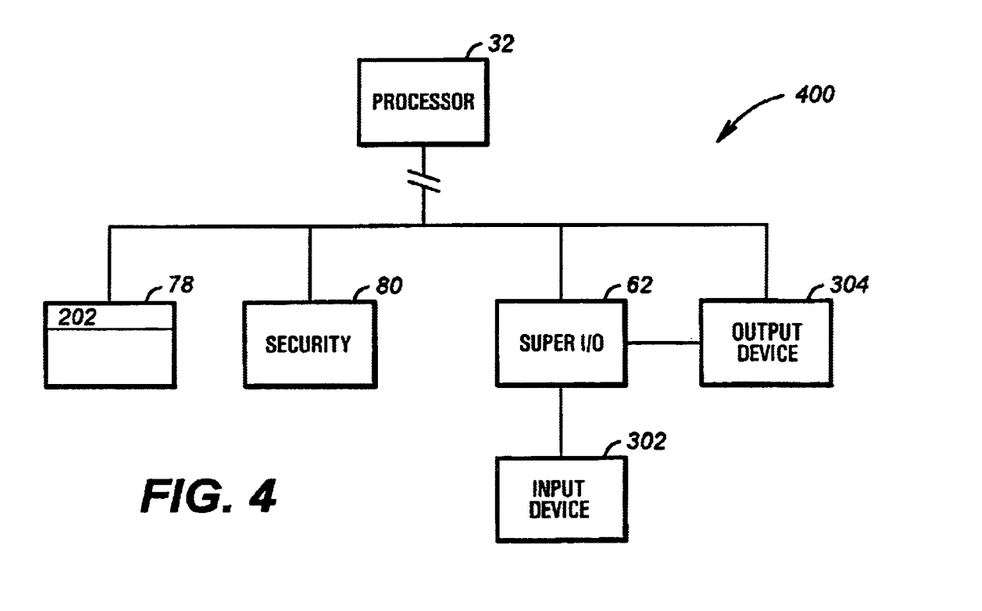
FIG. 4 is a block diagram of components initialized by a boot block in the computer system of FIG. 1.

Turning to FIG. 4, illustrated is a block diagram 400 of components of the system S that are initialized by the boot block 202. The processor 32 copies the system block code 208 from the ROM 78 into RAM, creating the ROM image, and then executes the system block 208 code, including the boot block 202 code contained in the ROM image. The processor 32, during initial power up and execution of boot block 202 code, executes the validation portion to determine if the flash ROM 78 has become corrupt. If the flash ROM 78 is corrupt, then the processor 32 executes the boot portion of the boot block to allow an administrator to re-flash portions of the boot block 202 code from a diskette. Also, during initial power up, when reflashing is not needed, the Super I/O device 62 and the security device 80 are initialized by the processor 32. BIOS code is also loaded from the ROM or NVRAM into RAM.

Figure 5:
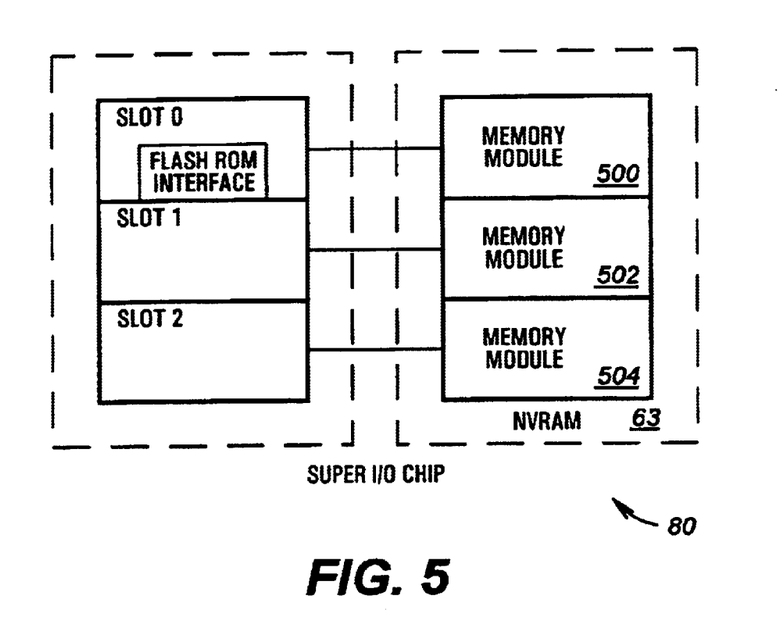
FIG. 5 is a schematic diagram of components of the computer system of FIG. 1 having multiple slots for connecting memory devices.

Whichever boot code the validation portion determines to use is loaded into NVRAM (nonvolatile memory) within the black box or security device 80 (FIGS. 1 and 5). The NVRAM is faster than the ROM itself. When power is applied to the system, the BIOS is booted from the ROM, either via the image or the NVRAM. The BIOS then attempts to complete system initialization in normal mode unless interrupted during initialization. BIOS execution continues from the NVRAM and, upon conclusion, launches the operating system. The NVRAM and black box may also reside in a dedicated chip or device, or may reside in the Super I/O 62.

The NV RAM Black Box

Turning now to FIG. 5, black box or security device 80 and NV RAM of the super I/O chip 62 are shown in greater detail. The black box 20 is nonvolatile RAM (NVRAM) that is composed of CMOS, yet is accessible only to the BIOS and the operating system (not to any other software running on the computer system). An unauthorized user, or one not possessing the appropriate administrative password, cannot access the location of the CMOS containing the ownership tag. The black box is a protected region within the NVRAM that is writeable only by the BIOS, and readable only by the BIOS and by the operating system. NVRAM is typically provided with back-up batteries to prevent power loss. The BIOS accesses the CMOS by generating an Int 15 h followed by the location within CMOS and, if the access is write enabled, data to be written to the CMOS location. This process is described below with respect to boot access to the ownership tag.

The memory security device 80 of FIG. 5 functions to lock and unlock resources within the computer system S, having multiple slots for connecting memory devices. The memory security device 80 of FIG. 4 includes three slots, numbered 0 through 2, each protected according to a different methodology. The contents of the memory devices connected to each security device 80 are accessible only to memory access requests complying with the corresponding methodology. Each slot of device 80 has two states: a locked state, in which data is protected, and an unlocked state. In the locked state, access is denied to the memory device connected to the corresponding slot. To transition to the locked state, a user must enter a "protect resources" command. To transition to unlocked state, transitioning the slot from the locked state, an "access resources" command must be issued, followed by a correct password.

Slot 0 of device 80 includes a flash ROM interface connecting to a flash ROM device, such as flash ROM 78. Slot 0 is the factory made protection level. It protects the flash ROM 78 from unauthorized writes such as viruses and unauthorized individuals. At power-up, the BIOS loads a flash ROM password into slot 0 and executes the "protect resources" command for that slot. After the system S has completed the boot process and before any other software is loaded, the BIOS issues a "protect resources" command to slot 0, disabling further access to the flash ROM 78.

Slot 1 of device 80 contains the "power-on" password of the user. The security device 80 communicates with the super I/O chip 62 containing the CMOS, by holding an "SIOAEN" and/or a "SIOWCL" signal to keep the super I/O chip 62 from decoding read and/or write cycles to the "power-on" password locations in the CMOS. The AEN signal is derived from ANDing a signal indicating that the black box slot 1 is locked and a signal indicating that the last data write to a real time clock index register was in the "power-on" password range, indicating that the user has missed an opportunity to access the "power-on" password location. Thus, the security device 80 controls access to the CMOS within the super I/O chip 62. The slot 1 of the black box selectively disables access to the "power on" password storage area 502 within the CMOS. In contrast, the SIOWCL signal operates similarly to the SIOAEN signal, although the SIOWCL signal only prohibits writes and does not prohibit reads to the password. Thus, the SIOWCL signal may be used during subsequent user sessions to determine whether the user password has been entered correctly.

Slot 2 of the security device 80 is accessible only with an administrator password. The limited access of the slot 2 memory device protects system resource information that must be protected to preserve the integrity of the computer system. The administrator password is necessary to access particular registers of CMOS region 504. As has been noted, the ownership tag of the computer system S according to the present invention is stored in region 504. The unlocking of slot 2, however, also unlocks slot 1, allowing an administrator cognizant of the administrator password to access these CMOS locations. Thus, the administrator has control of these memory locations in the computer system. It is recommended that, prior to unlocking slot 2, the administrator check the status of slot 1 to see if it is locked, since relocking slot 2 does not re-lock slot 1.

The ownership tag can also be secured without the black box 80. In some implementations, the black box 80 can be used to store the ownership tag and increase the security level. However, this is not required. As has been noted, the ownership tag is protected as a minimum normally by administrator password.

Figure 6:
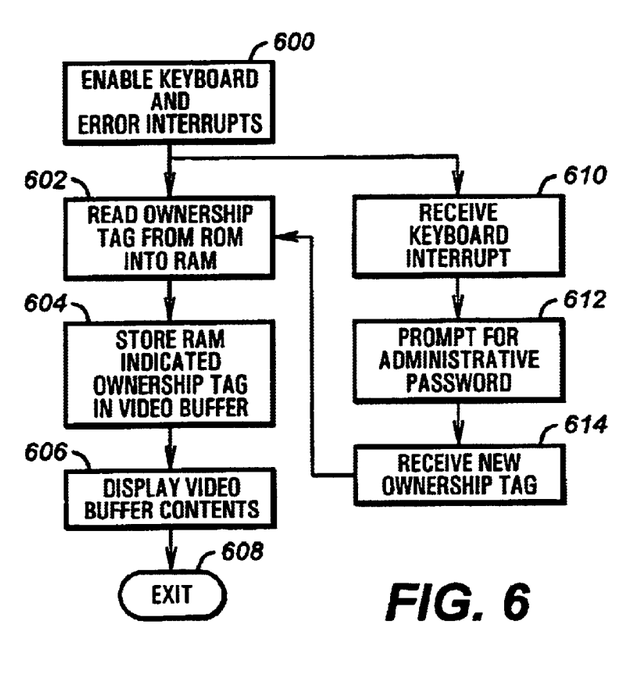
FIG. 6 is a flow chart of POST execution according to the present invention.

According to the present invention, the ownership tag is preferably displayed during the POST routine for the computer system S. FIG. 6 in the drawings illustrates a flow chart of those steps which accomplish he display of the ownership tag on the display 82. As will be noted, the ownership tag may be displayed as a routine portion of the normal POST routine, or alternatively may be changed by an authorized administrator and then subsequently displayed. The remaining portions of the POST process are conventional and are depicted, for example, in co-pending U.S. application Ser. No. 09/123,307, "COMPUTER SYSTEM WITH POST SCREEN FORMAT CONFIGURABILITY," filed Apr. 12, 2001.

During the conventional POST process, a step 600 occurs when the error interrupts and interrupts from the keyboard 68 are enabled. At this point the display of the ownership tag according to the present invention occurs Normally, a step 602 assumes operation of the computer system S during the POST process and causes the ownership tag to be transferred from location 202 in the flash ROM 78 and transferred into a suitable RAM memory location in the computer system S. Thereafter, during step 604, the ownership tag is transferred from the RAM memory location into a video buffer in the video card 150 during a step 604. Thereafter, during step 606, the ownership tag contained in the video buffer is displayed on the display 82 during a step 606, from which control of the computer system S reverts back to the remaining portions of the conventional POST process described in the co-pending application mentioned above.

This is done by a user depressing a suitable key, generating a keyboard interrupt during step 610. Thereafter, during a step 612, the computer system S prompts the user for the administrator password required for access to slot 2 of the security device 80 in order to access region 504 of CMOS memory containing the administrator password. If the proper administrator password is received, the ownership tag stored in slot 2 of the security device 80 may be modified during a step 614. If an improper password is attempted during step 612, access to the slot 2 of the security device 80 is prohibited. After the ownership tag is received during step 614, control of the computer system S transfers to step 602 and display operations continue in the manner previously described.

An example code for retrieving and displaying the ownership tag according to the present invention is set forth below:

```
dpaintOwnershipTag - Draws the ownership tag onto clean screen.
Entry:     None
Exit:      Ownership tag is visible on the clean screen.
Regs:      Flags
dPaintOwnershipTag proc near
           push   dx
           push   bx
           mov    dh,COWNERTAG_ROW          ; DH = Row to display string
           mov    bx, (CSCREEN_PAGE SHL 8) OR COWNERTAG_ATTR
                                             ; Page 3, Attribute=70h
           call   dWriteOTString             ; Write the string.
           pop    bx
           pop    dx
           ret                               ; return to caller
dPaintOwnershipTag endp
;***************************************************************
    DisplayOwnershipTag - This routine puts the Ownership tag on the normal (verbose) boot
screen.
    Entry:   None
    Exit:    String is displayed.
    Regs:    flags.
    Notes: This routine is called to display the normal string as well as the "clean boot" string.
;---------------------------------------------------------------
DisplayOwnershipTag proc near
    push   dx
    push   bx
    mov    dh,OWNERTAG_ROW            ; DH = Row to display string.
    mov    bx,(NSCREEN_PAGE SHL 8)    + OWNERTAG_ATTR
                                       ; Page 0, Attribute=07h
    call   dWriteOTString              ; Write the string.
    pop    bx
    pop    dx
    ret                                ; return to caller
DisplayOwnershipTag endp
;***************************************************************
    dWriteOTString - This routine pumps the ownership tag out onto the screen.
    Entry:   BL = Text attribute for string.
             BH = Video page # to write to.
             DH = Row to write string to.
    Exit:    If user has set a string, it will be displayed.
    Regs:    flags.
    Notes: This routine is called to display the normal string as well as the "clean boot" string.
;---------------------------------------------------------------
dWriteOTString proc near
    push   es
    push   ds
    pusha
    push   dx                          ;) Save entry parameters.
    push   bx                          ;)
                                       ; Get Ownership Tag into DS:SI
                                       ; ------------------------------
    mov    ax,0E845h                   ; AX=E845="Get/Set NVS Features"
    xor    bx, bx                      ; DL=0="Read NVS Feature"
    mox    cx, 13h                     ; CX=13="Read Ownership Tag"
    push   OT_SCRATCH_SEG              ;)DS=Scratch segment
    pop    ds                          ;)
    mov    si,OT SCRATCH OFS           ; SI = Scratch offset
    int    15h                         ; Go get it!
    jc     short pot_done              ; If no ownership tag, get out.
                                       ; Determine length of ownership tag
                                       ; ------------------------------
    push   ds                          ; )ES=DS
    pop    es                          ;)
    mov    di, si                      ; Go to end of string
    mov    cx, 80                      ; Scan max 80 characters
    add    di, cx                      ;) Start at end of string
    dec    di                          ;)
    std                                ; Scan backwards . . .
    mov    al,' '                      ; . . . for first non-space.
    repe   scasb                       ; Do it!
    jz     pot_done                    ; Y; ZF set=empty
    inc    cx                          ; Adjust CX for last scasb
                                       ; DS,ES:SI=&OwnerTag, CX=Length
                                       ; Center and display string
                                       ; ------------------------------
    mov    bp,si                       ; BP=Offset of string
    pop    bx                          ; Restore page# and attribute
    pop    dx                          ;) Restore row to show string
    push   dx                          ;) Preserve stack integrity
```

-continued

```
        push    bx              ;]
        mov     dl,80           ; DL=# columns on screen
        sub     dl, cl          ;)
        shr     dl, 1           ;) DL = offset of centered string
        mov     ax, 01300h      ; AX-"Write String, keep cursor"
        int     10h             ; Write string!
pot_done:
        pop     bx              ;) Clean up stack
        pop     dx              ;}
        popa
        pop     ds
        pop     es
        ret
dWriteOTString endp
;****************************************************************************
```
Read/Write the Ownership Tag. It is Administrator Password protected on writes. It resides in the ESCD sector of the ROM.
NOTE: This is a code excerpt from a runtime service which is called by the ROM Setup Software to read and/or write the Ownership tag. It demonstrates the password protected nature of ownership tag, and shows how it is stored in a flash sector.
Ownership Tag:
```
        mov     ex.OWNERSHIPTAG_LENGTH  ;
        call    outline_on?             ; Q;ESCD from RUNTIME seg
        jz      short ot_runtime        ; Y: Get it from runtime
                                        ; N: Get it from post buffer
        push    es                      ; Save ES
        mov     edi,ESCD_WRITE_BUFFER+OWNERSHIP_TAG AND 0FFFFh
        pushw   ((ESCD_WRITE_BUFFER+OWNERSHIP_TAG) SHR 4) AND 0F000h
        jmp     short ot_common         ; Join common code.
ot_runtime;
        mov     edi,ESCD_RUNTIME_BUFFER+OWNERSHIP_TAG AND 0FFFFh
```
Setup ES for real/virtual/protected-16 bit calls that use read/write ESCD
```
setup_ES:                               ; Entry point to setup ES
        push    es                      ; Save ES
        mov     ax,cs                   ; Get CS
        cmp     ax,0F000h               ; Q: Real or Virtual 85 mode?
        jne     ot_p16                  ;     no must be protected-16
        push    cs
        jmp     short ot_common         ; real mode just use cs
ot_p16;                                 ; Protected-16 use ES they
        push    es                      ; passed in. ES-base 0F000h
                                        ; limit 0FFFFh
ot_common;
        pop     es                      ; ES = pointer to string data
```
Read/Write the Variables/Strings stored in the ESCD sector of the ROM.
```
        Input:  ES:EDI  := variable address in ESCD buffer
                CS:EBP  := CMOSFeaturess2 table entry address
                ECX     := string length
                BL      := Read/Write flag
                DS:ESI  := Read/Write buffer pointer
ReadWriteESCDStrs:
        or      bl, b1                  ; Q: Reading?
        jne     short WriteESCDStr      ;   N: go Write the ESCD String
                                        ;   Y: return the ESCD String in DS:SI
        test    cs:[ebp+FFLAG],PWPROT_RD ; Q: Is Read Password Protected?
        je      short @f                ;   N: continue
                                        ;   Y: check Admin PW
        call    rwpd_test_admin_mode
        stc                             ; assume falure
        jz      short RWESCDStrsExit    ;   N. done
                                        ;   Y: continue
@@:
        mov     al, es: [edi]           ;transfer the bytes
        inc     edi                     ;
        mov     [esi], al               ;
        inc     esi                     ;
        loop    @b                      ; next byte
        clc                             ; indicate success
        jmp     short RWESCDStrs Exit   ;
```
Transfer the new ESCD String to the ESCD buffer and then Flash the ROM via SMI.
```
WriteESCDStr:
        test    ca; [ebp+FFLAG],PWPROT_WR ; Q: Is Write Password Protected?
        je      short @f                ;   N: continue
                                        ;   Y: check Admin PW
        call    rpwd_test_admin_mode
        stc                             ; assume falure
        jz      short RWESCDStrsExit    ;   N: done
                                        ;   Y: continue
@@:
```

-continued

```
    call    hhwF000WriteEnable            ; open up F0000h
@@:
    mov     a1, [esi]                     ; transfer the bytes
    inc     esi                           ;
    mov     es;[edi], a1                  ;
    inc     edi                           ;
    loop    @b                            ; next byte
    call    hhwF000WriteProtect           ; close F0000h
    call    UpdateFlashData_SMI           ; go Flash the ESCD part of the ROM
    clc                                   ; indicate success
RWESCDStreExit:
    pop     es
    ret
***********************************************************************
```

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. In a computer system containing a processor for executing instructions, a method comprising the steps of initializing the processor;

reading an ownership tag to be displayed for identifying an owner or person authorized custody or allocation of the computer system;

displaying the ownership tag on a display during execution of the step of initializing the processor;

storing the ownership tag in a non-volatile memory in the computer system;

receiving a command from a user to allow access to the nonvolatile storage device;

determining whether the user has administrator authorization;

when the user does not have administrator authorization, allowing the user to access a first region of the non-volatile storage area, the first region having a first level of security and containing user-determined information, the information in the first region being user alterable and administrator-alterable; and when the user has administrator authorization, allowing the user to access a second region having a higher level of security containing administrator-determined information, the information in the second region being only administrator-alterable, the ownership tag being in the second region.

2. The method of claim 1, further comprising the steps of reading the ownership tag and an administrator-determined password; and when the user has administrator authorization, allowing the user to access the administrator-determined password.

3. In a computer system containing a processor for executing instructions, a method comprising the steps of initializing the processor;

reading an ownership tag to be displayed for identifying an owner or person authorized custody or allocation of the computer system;

displaying the ownership tag on a display during execution of the step of initializing the processor; storing the ownership tag in a non-volatile memory in the computer system;

receiving a command from a user to allow access to the nonvolatile storage device;

determining whether the user has administrator authorization;

when the user does not have administrator authorization, allowing the user to access a first region of the non-volatile storage area, the first region having a first level of security and containing user-determined information, the information in the first region being user alterable and administrator-alterable;

when the user has administrator authorization, allowing the user to access a second region having a higher level of security containing administrator-determined information, the information in the second region being only administrator-alterable, the ownership tag being in the second region;

reading the ownership tag and an administrator-determined password; and when the user has administrator authorization, allowing the user to access the administrator-determined password;

receiving a first predetermined state-transition command from user having administrator authorization;

after receiving the first predetermined state-transition command, receiving an administrator password from the user having administrator authorization;

after receiving the administrator password from the user having administrator authorization, transitioning a highly secure region of the nonvolatile storage device, the region containing administrator-determined information including the ownership tag, from a protected state to an unprotected state;

after transitioning the highly secure region, allowing alteration of contents of the region, including allowing alteration of the password and of the ownership tag; after allowing alteration of contents of the region, receiving a second predetermined command from the user having administrator authorization; and after receiving the second predetermined command when the region is in the unprotected state, transitioning the region from the unprotected state to the protected state.

* * * * *